United States Patent
Grabowski

[11] Patent Number: 6,077,426
[45] Date of Patent: Jun. 20, 2000

[54] FILTER FILLED WITH LOOSE BULK MATERIAL

[75] Inventor: Gunther Grabowski, Langgöns, Germany

[73] Assignee: Grabowski Tropfkörper-Technik GmbH, Ober-Mörlen, Germany

[21] Appl. No.: 09/014,702

[22] Filed: Jan. 28, 1998

[30] Foreign Application Priority Data

Feb. 5, 1997 [DE] Germany ............... 197 04 238
Dec. 2, 1997 [EP] European Pat. Off. ........... 97121109

[51] Int. Cl.[7] .................................................. B01D 24/46
[52] U.S. Cl. .................... 210/189; 210/256; 210/265; 210/268; 210/274
[58] Field of Search ........................ 210/265, 268, 210/269, 274, 275, 289, 291, 332, 189, 256

[56] References Cited

U.S. PATENT DOCUMENTS

| | | | |
|---|---|---|---|
| 3,667,604 | 6/1972 | Lagoutte | 210/136 |
| 3,716,969 | 2/1973 | Maeda | 55/390 |
| 3,798,159 | 3/1974 | Kisbocskoi et al. | 210/189 |
| 3,987,148 | 10/1976 | Squires | 210/268 |
| 4,060,484 | 11/1977 | Austin et al. | 210/268 |
| 4,197,201 | 4/1980 | Hjelmner et al. | 210/269 |
| 4,399,034 | 8/1983 | Möller | 210/268 |
| 4,861,472 | 8/1989 | Weis | 210/189 |

FOREIGN PATENT DOCUMENTS

| | | |
|---|---|---|
| 0 128 234 | 12/1984 | European Pat. Off. . |
| 0 169 606 | 1/1986 | European Pat. Off. . |
| 0 174 037 | 3/1986 | European Pat. Off. . |
| 329 176 | 11/1920 | Germany . |
| 21 26 631 | 12/1971 | Germany . |
| 34 32 377 | 11/1985 | Germany . |
| 42 10 571 C1 | 9/1993 | Germany . |
| 195 18 448 A1 | 5/1996 | Germany . |

*Primary Examiner*—Ivars Cintins
*Attorney, Agent, or Firm*—Evenson, McKeown, Edwards & Lenahan, P.L.L.C.

[57] ABSTRACT

A filter with a horizontally fed filter chamber having loose bulk material as the filter medium has a wall on the upstream side and downstream side to hold back the loose bulk material in the filter chamber. The filter chamber includes a compressed air-lift pump disposed inside of the filter chamber for pumping the loose bulk material from a bottom area of the filter chamber, through a bottom lifter connected with a stand pipe to an upper rinse chamber, and a hopper disposed at a bottom of the filter chamber having entrance slots and surrounded by a chamber that is provided with a rinse water inlet tube connected to a raw water chamber.

7 Claims, 3 Drawing Sheets

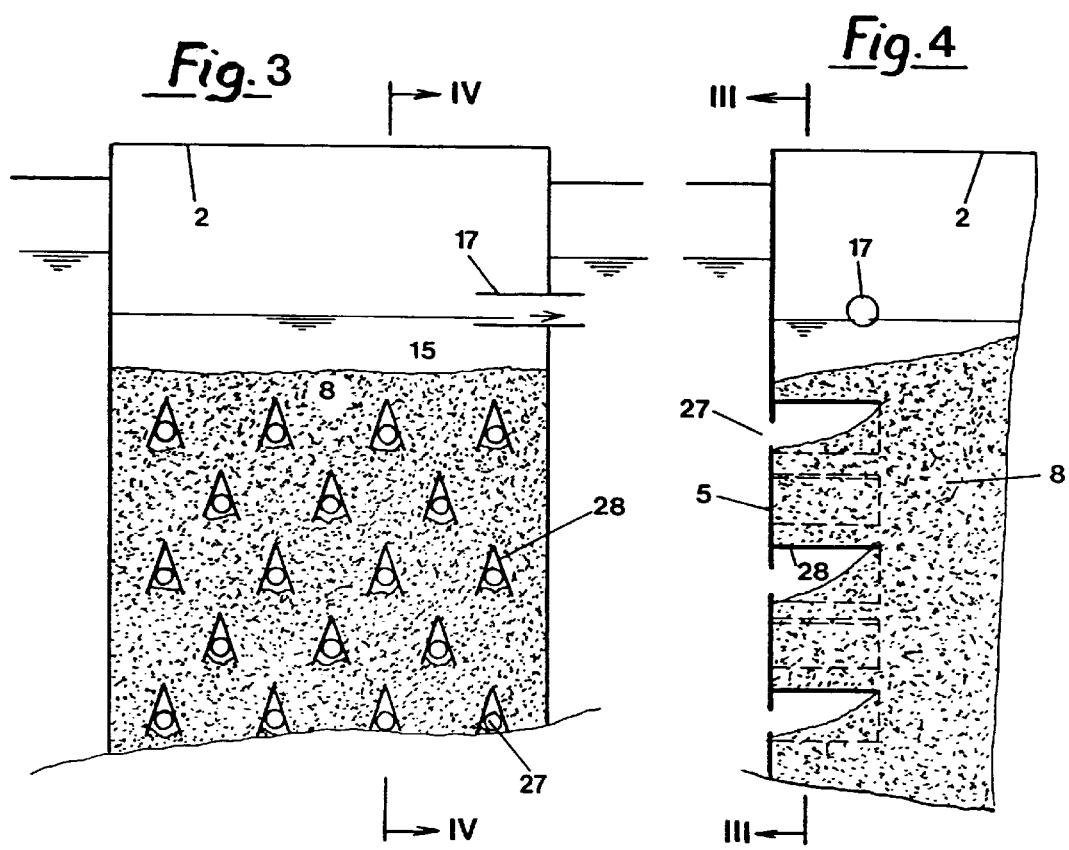

_6,077,426_

FILTER FILLED WITH LOOSE BULK MATERIAL

BACKGROUND AND SUMMARY OF THE INVENTION

This invention relates to filters. More particularly, this invention relates to a filter of the type having a horizontally fed filter chamber containing loose bulk material as a filter medium and having on the inlet side and on the outlet side a permeable wall for retaining the loose bulk material in the filter chamber and having a compressed-air lift pump for driving the loose bulk material from a funnel disposed beneath the filter chamber in which a bottom lifter is installed from which a standpipe reaches into a rinse chamber above it.

This application claims the priority of German patent application No. 197 04 238.4, filed Feb. 5, 1997, and European patent Application No. 97121109.9, filed Dec. 2, 1997, the disclosures of which are expressly incorporated by reference herein in their entirety.

U.S. Pat. No. 4,399,034 discloses a filter for fluids, wherein the fluid flows through the filter medium at an angle instead of vertically or horizontally. The filter granules contained as the filter medium in a rectangular or cylindrical housing are drawn from the bottom of a hopper and fed for back rinse into a wash zone lying above the filter followed by a distributing apparatus. The outer walls of the filter have slanting slots to let out the fluid, while the fluid to be cleaned is fed through a plurality of stacked inlet cones which are disposed centrally in the bottom part of the filter apparatus. To be able to pump the contaminated filter granules out of the bottom of the hopper, rinse water is pumped into the hopper bottom from the wash zone.

The filter of U.S. Pat. No. 4,399,034 has the primary disadvantage of a very small filter inlet area which forms around the inlet hopper. It is much too small in proportion to the size of the filter outlet area and to the generally large filter volume. In the inlet area the filter medium will therefore very quickly become clogged with impurities, so that the filter resistance increases greatly after a short period of operation. To replace the relatively small amount of filter material in the inlet area a considerably greater amount of less contaminated filter material must be drawn off and necessarily included in the treatment. Another disadvantage results from the fact that the inlet and outlet slots are disposed vertically one under the other. The filter material lying on the slanting slot surfaces is not caught by the vertically descending flowing bed and cakes up, forming a stubborn barrier reducing the free passage area. Both the large bulk of the filter and the various ducts running in and out require a free-standing set-up and accessibility on all sides, which prevents adding the filter onto an existing wastewater pool.

Horizontally swept loose bulk material filters have not as yet been used in wastewater technology, although a horizontally directed flow offers very good conditions as regards the configuration of the filter and its operation, as well as versatility of use.

The present invention is addressed to the problem of creating a horizontally swept filter of the kind named above, which will have the least possible resistance to flow and will not tend to clog even in unfavorable conditions.

This problem is solved by the invention if the hopper has inlet slots close to the bottom and is surrounded by a chamber which is provided with a rinse-water feed tube connecting it to a raw water chamber.

In such a filter the loose bulk material in the lower region of the filter chamber is continuously or periodically drawn off and fed back up to it again. At the same time the loose bulk material is freed of the dirt particles and the rinse water is drawn off separately. The filter is configured to special advantage if the pump in the filter chamber is a compressed-airlift pump for driving the loose bulk material from a funnel disposed beneath the filter chamber through a standpipe and into a rinse chamber above it. Such a pump, often called a "mammoth pump," is especially reliable in operation and in the pumping process it frees the loose bulk material from the impurities that have been filtered out. The compressed-air lift pump requires much fluid in order to drive the loose bulk material, but raw water from the settling tank outside can be used directly. Since the amount of fluid which the compressed-air lift pump discharges is greater than that which can flow back simultaneously through the loose bulk material into the filter chamber, a backup takes place in the rinse chamber which has drain openings arranged at a specific height, through which the raw water contaminated by dirt particles escapes. The filter medium itself, therefore, is not affected by the greater amount of fluid required for carrying the loose bulk material.

A contribution to the further improvement of the purifying action is made when the stand pipe reaches into the bottom lifter and terminates in the rinse chamber where it tangentially adjoins an arcuate turnaround means. By the centrifugal forces it creates, such a deflecting means assists the separation of the loose bulk material from the raw water contaminated with dirt particles. The centrifugal forces produced by such a deflecting means help to separate the loose bulk material from the raw water contaminated with dirt particles.

The filter according to the invention can easily be installed in existing settling tanks without major remodeling if the filter chambers are of modular design and can be disassembled. Thus, by fitting together a plurality of filter chambers any desired filtration capacity can be achieved.

It is quite especially advantageous if the filter chambers or a plurality of assembled filter chambers are disposed as an end wall of a horizontal-flow settling tank for waste water purification. Thus the area of the settling tank downstream from the filter chamber or filter chambers becomes a clean water area from which the filtered waste water can flow from the settling tank on the path already designed without the filter.

Alternatively, however, it is also possible to arrange at the downstream side of the filter chamber a filtrate collecting chamber forming a single unit with the filter chamber. Such an embodiment makes it possible to install the filter of the invention at any desired points in a settling tank, on two lateral walls for example. The filtrate then is produced in the filtrate collecting chamber from which it is to be drawn. At the same time the individual units can be arranged both in tandem to increase the filtering action, and in parallel to increase the throughput. They can easily be fitted into existing systems. An island system for installation in still waters is also easy to create, in which case the filtrate can then be withdrawn upwardly.

The medium to be purified can be fed downward to a round filter exactly as taught in the prior art if, on the input side of the filer chamber a vertical inlet forming one unit with the filter chamber is arranged.

The problem of preventing the escape of filter medium from the two permeable walls without impeding the ongoing replacement of the fill material in the area of the openings can also be solved in the invention by providing the walls with a plurality of openings, one above the other and offset from one another and side by side, each shielded on the inside by an eave-like angle iron above and on the side, the apex of the angle iron pointing upward and its two flanges reaching below the bottom edge of the particular opening. Such eave-like angle irons reliably prevent the escape at the openings of the loose bulk material that does not settle downward and therefore cannot be cleaned and renewed.

BRIEF DESCRIPTION OF THE DRAWINGS

Other objects, advantages and applications of this invention will be made apparent by the following detailed description. The description makes reference to a preferred and illustrative embodiment of the invention presented in the accompanying drawings wherein:

FIG. 3 is a vertical section through a portion of a filter chamber seen from the front; and FIG. 4 is a vertical section taken along the line IV—IV of FIG. 3.

DETAILED DESCRIPTION OF THE PREFERRED EMBODIMENTS

Figure 1:
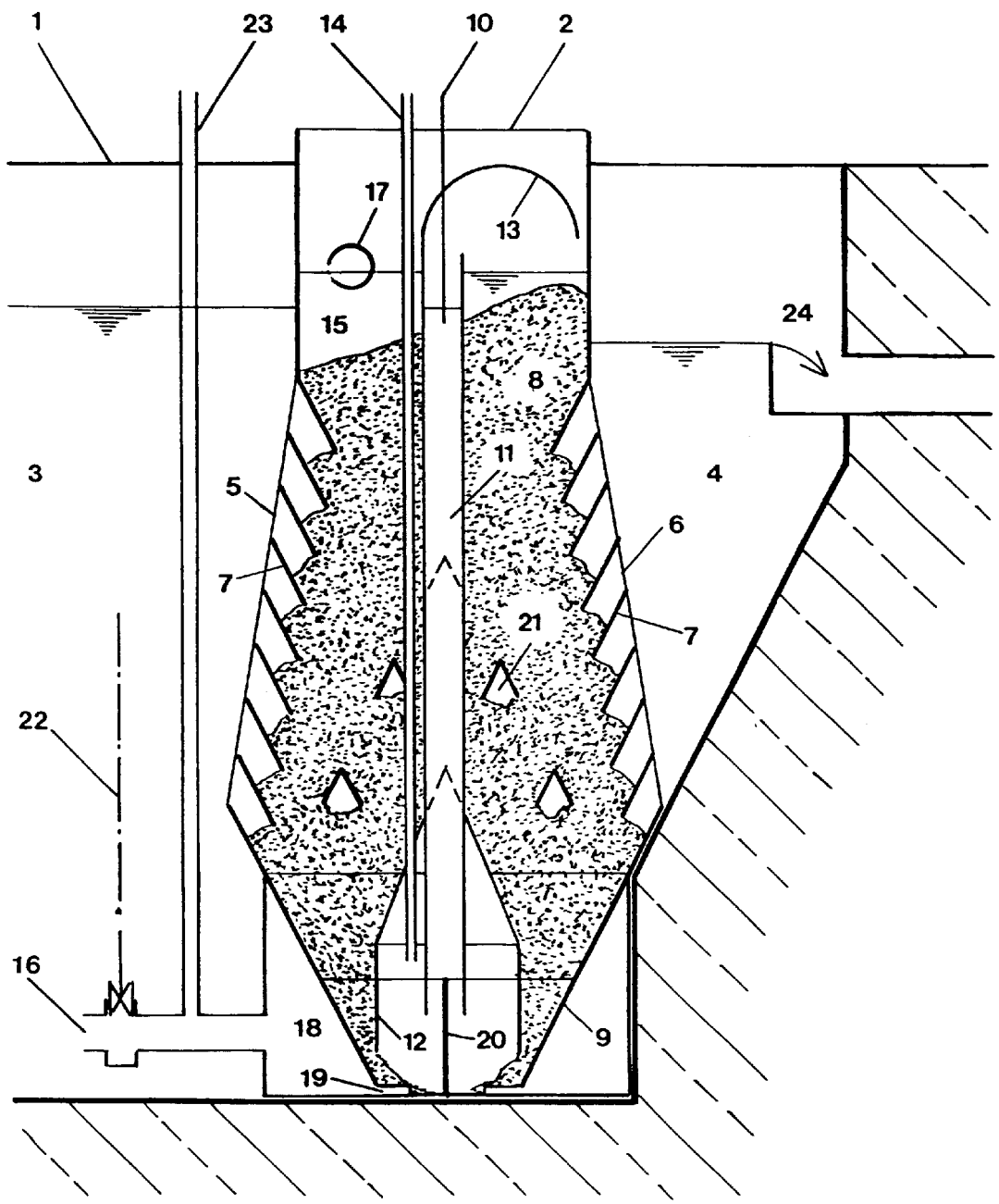
FIG. 1 is a longitudinal section through a portion of a settling tank with the filter according to the invention.

FIG. 1 shows a settling tank 1 into which a filter chamber 2 of rectangular cross section is inserted downwardly from the top. The filter chamber 2 divides the settling tank 1 into a raw water chamber 3 and a filtrate chamber 4. The filter chamber 2 is defined both on the inflow side and on the outflow side by permeable walls 5 and 6 which have numerous angle irons 28, one above the other and offset from one another and side by side, reaching into the interior of the filter chamber 2. The distance between the walls 5 and 6 increases uniformly toward the bottom. Inside of the filter chamber loose bulk material 8 is present as the filter medium, which is preferably sand, and which was filled into the filter chamber 2 to a point above the topmost angle iron 28. At its bottom the filter chamber 2 has one or more hoppers 9 of quadrangular cross section. A pump 10, configured as a compressed-air lift pump, serves in this embodiment as a means of withdrawing the loose bulk material 8 from the hopper 9, and has a stand pipe 11 connecting a bottom lifter 12 with a turnaround means 13 situated in the upper part of the filter chamber 2.

If compressed air is fed into the bottom lifter 12 through the compressed air line 14, the lifter rises upwardly in the stand pipe 11. Due to the resultant upward flow, loose bulk material flowing into the hopper 9 is pumped into a rinse chamber 15 at the top of the filter chamber 2 and thus freed of adherent impurities. The loose bulk material 8 is discharged by the turnaround means 13 into the outflow half of the filter chamber 2, while the rinse water with the impurities leaves the filter chamber through the rinse water outlet 17.

The water required for this rinsing and pumping action runs from the raw water chamber 3 through a rinse water entrance pipe 16 into a chamber 18 surrounding the hopper and connected to the hopper by entrance slots 19 close to the bottom.

To improve the cleansing effect it is also possible to feed rinse water under pressure through a water pressure line 23 after closing a valve 22.

When the settling tank is operating, raw water flows, from the left to the right in the drawing, from the raw water chamber 3 horizontally through the bulk material in the filter chamber 2 into the filtrate chamber 4, leaving the settling tank 1 through an overflow 24 which is at a lower level than the inlet (not shown) into the settling tank, so that, when the flow stops the water level in the settling tank 1 is higher than the level of the bulk material 8 in the filter chamber 2.

Figure 2:
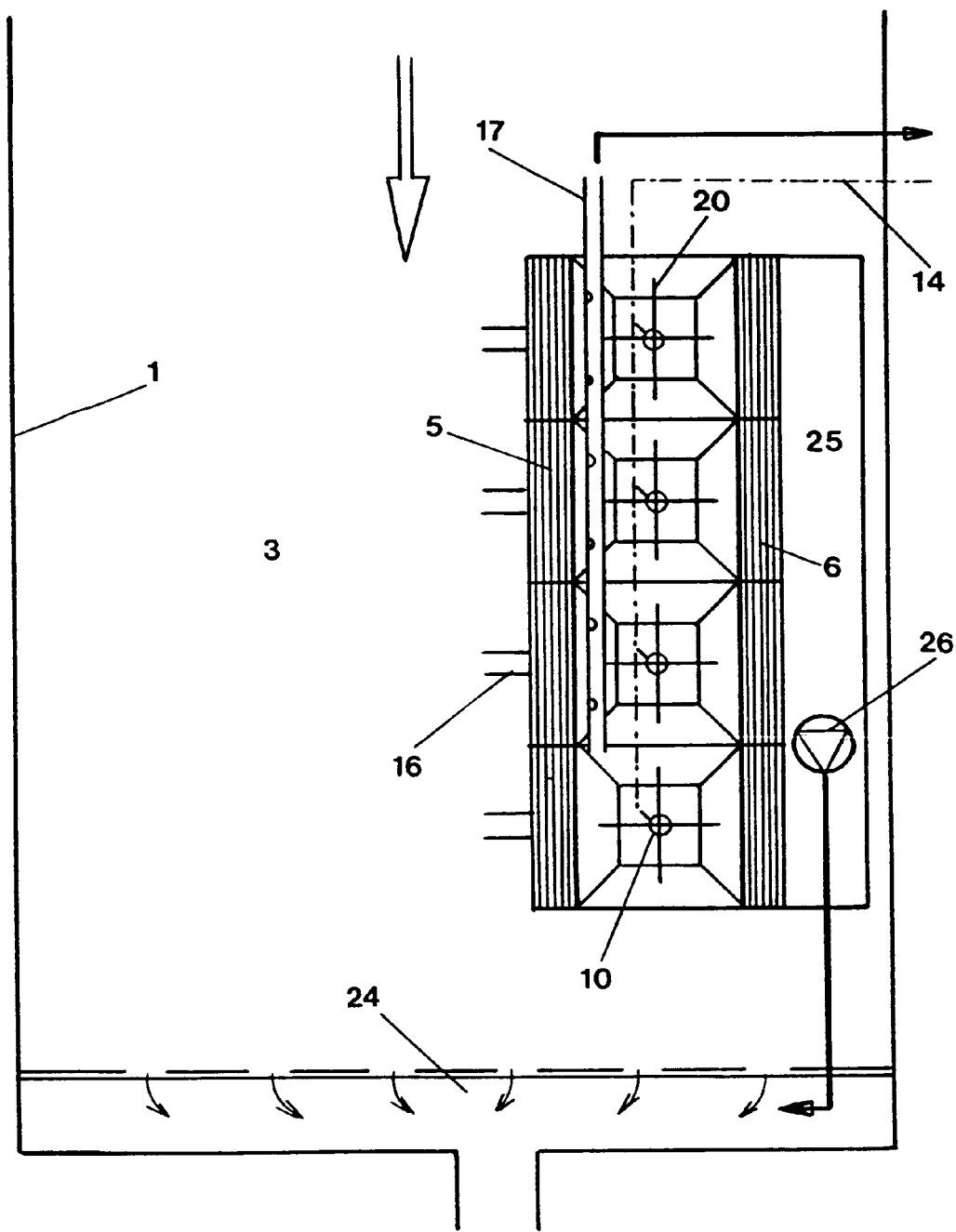
FIG. 2 is a top plan view of a portion of a settling tank with a multicellular filter according to the invention, disposed on a side wall with a filter collecting chamber and filtrate pump.

FIG. 2 shows that a plurality of filter chambers 2 can be put together at an appropriate place in an existing settling tank 1, if the filter chambers 2 form a unit with a filtrate collecting chamber 25 adjoining it on the downstream side and the filtrate is pumped with a filtrate pump 26 into the more highly placed overflow 24. With such an apparatus, a mostly slow rate of flow can be treated by filtration, for example, while in the case of an extraordinarily high inflow of waste water, mixed with rain water for example, the excess amount runs past the apparatus directly into the overflow 24.

FIGS. 3 and 4 show in front and side vertical sections a wall 5 of the filter chambers 2. This wall 5 has a plurality of flow-through openings 27 disposed side by side and one over the other. On the inside of the permeable wall 5, short angle irons 28 are mounted in a roof-like manner. Their apexes are pointed upward. Their sides straddle the opening 27 and reach so far downward that the loose bulk material cannot escape. The permeable wall 6, which is not seen in FIGS. 3 and 4 is in a mirror-image relation on the outflow side to the permeable wall 5 which is seen. In contrast to the embodiment in FIGS. 1 and 2, the permeable walls 5 and 6 can be parallel to one another in the embodiment shown in FIGS. 3 and 4.

While there is shown and described present preferred embodiments of the invention, it is to be distinctly understood that the invention is not limited thereto but may be otherwise variously embodied and practiced within the scope of the following claims.

What is claimed is:

1. A filter with a horizontally fed filter chamber having an upstream side and a downstream side and containing loose bulk material as a filter medium, said filter chamber comprising:

permeable walls on the upstream side and downstream side to hold the loose bulk material in the filter chamber, and a compressed air-lift pump disposed in said filter chamber for pumping the loose bulk material from the bottom area of the filter chamber through a bottom lifter connected with a stand pipe to an upper rinse chamber;

arcuate turn-around means in the upper rinse chamber wherein the stand pipe terminates in the upper rinse chamber tangentially to the arcuate turn-around means, and a hopper disposed at a bottom of the filter chamber having entrance slots and surrounded by a chamber that is provided with a rinse water inlet tube connected to a raw water chamber.

2. A filter according to claim 1, wherein the filter chamber is configured as a modular unit which can be taken apart.

3. A filter according to claim 1, further comprising a filtrate collecting chamber disposed on the downstream side of the filter chamber forming a unit with the filter chamber.

4. A filter according to claim 1, wherein the permeable walls have a plurality of offset flow-through openings one over the other and side by side, which are each shielded on the inside by an eave comprising an angle iron above and laterally, wherein an apex of each angled iron eave points upward and has two flanges extending under the bottom edge of a particular flow-through opening.

5. An apparatus for waste water purification comprising at least one filter chamber according to claim 1 disposed in a settling tank.

6. An apparatus according to claim 5, comprising a plurality of filter chambers disposed in the settling tank.

7. A filter according to claim 1, further comprising an outlet from the upper rinse chamber for rinse water containing impurities.

* * * * *